US009302646B2

United States Patent
Hall

(10) Patent No.: US 9,302,646 B2
(45) Date of Patent: Apr. 5, 2016

(54) SEAT BELT RETRACTOR

(71) Applicant: TK HOLDINGS INC., Auburn Hills, MI (US)

(72) Inventor: Christopher D. Hall, Algonac, MI (US)

(73) Assignee: TK Holdings Inc., Auburn Hills, MI (US)

( * ) Notice: Subject to any disclaimer, the term of this patent is extended or adjusted under 35 U.S.C. 154(b) by 165 days.

(21) Appl. No.: 13/937,688

(22) Filed: Jul. 9, 2013

(65) Prior Publication Data

US 2014/0014759 A1 Jan. 16, 2014

Related U.S. Application Data

(60) Provisional application No. 61/690,982, filed on Jul. 10, 2012.

(51) Int. Cl.
| | |
|---|---|
| *B60R 22/38* | (2006.01) |
| *B60R 22/34* | (2006.01) |
| *B60R 22/44* | (2006.01) |
| *B60R 22/28* | (2006.01) |

(52) U.S. Cl.
CPC .............. *B60R 22/34* (2013.01); *B60R 22/44* (2013.01); *B60R 2022/287* (2013.01); *B60R 2022/4473* (2013.01)

(58) Field of Classification Search
CPC .. B60R 22/28; B60R 22/341; B60R 2022/287
USPC ................. 242/379.1, 390; 280/805; 297/472
See application file for complete search history.

(56) References Cited

U.S. PATENT DOCUMENTS

| | | |
|---|---|---|
| 5,071,194 A | 12/1991 | Fohl |
| 6,264,127 B1 | 7/2001 | Blackadder et al. |
| 6,427,935 B1 | 8/2002 | Fujii et al. |
| 6,568,621 B2 * | 5/2003 | Hiramatsu et al. ......... 242/379.1 |
| 6,726,249 B2 | 4/2004 | Yano et al. |
| 7,246,822 B2 | 7/2007 | Stanley |
| 7,380,740 B2 | 6/2008 | Tanaka et al. |

(Continued)

FOREIGN PATENT DOCUMENTS

JP    10-310027    11/1998

OTHER PUBLICATIONS

International Search Report mailed Oct. 10, 2013 issued in connection with International Application No. PCT/US2013/049711.

(Continued)

*Primary Examiner* — Sang Kim
(74) *Attorney, Agent, or Firm* — Gordon & Rees LLP

(57) ABSTRACT

A retractor including a rotatable shaft including a coupling feature, a lock base having a recess, a spool configured to rotate about an axis of rotation to wind and unwind the seat belt, a longitudinal member, and a drive member. The spool includes a central bore that extends along the axis of rotation and is configured to receive a first portion of the shaft therein. The longitudinal member includes a longitudinal bore and a transverse bore that intersects with the longitudinal bore, the longitudinal bore being configured to receive a second portion of the shaft therein. The drive member includes a first portion passing through the transverse bore and a second portion disposed in the recess, the first portion including an engaging feature, where a load is transmitted between the shaft and drive member when the engaging feature is coupled to the coupling feature.

15 Claims, 4 Drawing Sheets

(56) References Cited

U.S. PATENT DOCUMENTS

| | | |
|---|---|---|
| 7,946,519 B2 * | 5/2011 | Gray .............................. 242/374 |
| 8,005,597 B2 | 8/2011 | Bolton et al. |
| 8,220,735 B2 * | 7/2012 | Wang et al. ................... 242/374 |
| 2001/0017330 A1 | 8/2001 | Fujii et al. |
| 2002/0066818 A1 | 6/2002 | Tanji et al. |
| 2007/0090224 A1 | 4/2007 | Ng et al. |
| 2007/0194565 A1 * | 8/2007 | Clute ............................. 280/806 |
| 2008/0042001 A1 | 2/2008 | Schmidt et al. |
| 2011/0031340 A1 * | 2/2011 | Maekubo et al. .......... 242/379.1 |
| 2012/0104137 A1 * | 5/2012 | Axblom ..................... 242/379.1 |
| 2012/0234958 A1 * | 9/2012 | Stroik, Jr. ................... 242/379.1 |

OTHER PUBLICATIONS

Written Opinion of the International Search Authority mailed Oct. 10, 2013 issued in connection with International Application No. PCT/US2013/049711.

* cited by examiner

SEAT BELT RETRACTOR

CROSS-REFERENCE TO RELATED PATENT APPLICATIONS

This application claims the benefit of and priority to U.S. Provisional Patent Application No. 61/690,982, filed Jul. 10, 2012. The foregoing U.S. provisional patent application is incorporated by reference herein in its entirety.

BACKGROUND

This application relates generally to the field of retractors for use in seat belt assemblies for restraining occupants. More specifically, this application relates to a retractor having an improved coupling that is configured to operatively connect a seat belt (e.g., a webbing) to a spool. The retractor may be used in a motorized seat belt (MSB) system.

Some vehicles may be equipped with a motorized seat belt (MSB) system. The MSB system is equipped with a motor driven retractor. The system may alert the driver to potential dangers through the movement of the webbing. When a vehicle sensor, such as the car's radar device, mounted in the front portion of the car, detects a potential hazard (which includes, for example, combining the distance from the car in front, the relative speed of the car, and other information), the MSB system operates to warn the driver by lightly pulling two or three times on the webbing (accomplished by operating the motor to drive a spool in a retraction direction). When a collision is unavoidable, the MSB may automatically retract the webbing to eliminate any slack between the passenger and the seat belt.

However, when the motor of the MSB is directly coupled to the spool, the cycling of the MSB may fatigue features and components of the retractor utilized in pretensioning the seat belt webbing through the torsion bar. Fatigue to these features and components may cause the retractor to under-perform or shift into an energy management mode prematurely.

SUMMARY

One embodiment relates to a retractor for a seat belt system including a seat belt. The retractor includes a rotatable shaft including a coupling feature, a lock base having a recess, a spool configured to rotate about an axis of rotation to wind and unwind the seat belt, a longitudinal member, and a drive member. The spool includes a central bore that extends along the axis of rotation and is configured to receive a first portion of the shaft therein. The longitudinal member includes a longitudinal bore and a transverse bore that intersects with the longitudinal bore, and the longitudinal bore is configured to receive a second portion of the shaft therein. The drive member includes a first portion passing through the transverse bore and a second portion disposed in the recess, the first portion including an engaging feature, where a load is transmitted between the shaft and drive member when the engaging feature is coupled to the coupling feature.

Another embodiment relates to a motorized retractor for a seat belt assembly including a seat belt. The retractor includes a spool configured to rotate about an axis of rotation to wind and unwind the seat belt, a rotatable shaft including a coupling feature, a lock base including a groove, a drive member disposed in the groove and including an engaging feature, and a motor configured to drive rotation of the shaft. A load is transferred between the shaft and the lock base through the drive member when the engaging feature engages the second coupling feature.

Yet another embodiment relates to a motorized retractor for a seat belt system including a seat belt. The retractor includes a spool, a rotatable shaft, a motor, a lock base, a longitudinal member, and a drive member. The spool is configured to wind and unwind the seat belt. The motor is configured to drive rotation of the shaft about an axis of rotation. The lock base includes a recess extending in a transverse radial direction relative to the axis of rotation. The longitudinal member includes an inner bearing surface, an outer bearing surface, and a shoulder, such that the inner bearing surface supports a surface of the shaft, the outer bearing surface supports a surface of the lock base, and the shoulder is disposed in a cavity of the lock base. The drive member is disposed in the recess and is configured to prohibit relative rotation between the shaft and lock base when the drive member is coupled to the shaft. The shoulder includes an arm that is configured to contact a surface of the lock base after a relative rotation between the lock base and the longitudinal member.

DETAILED DESCRIPTION

Figure 1:
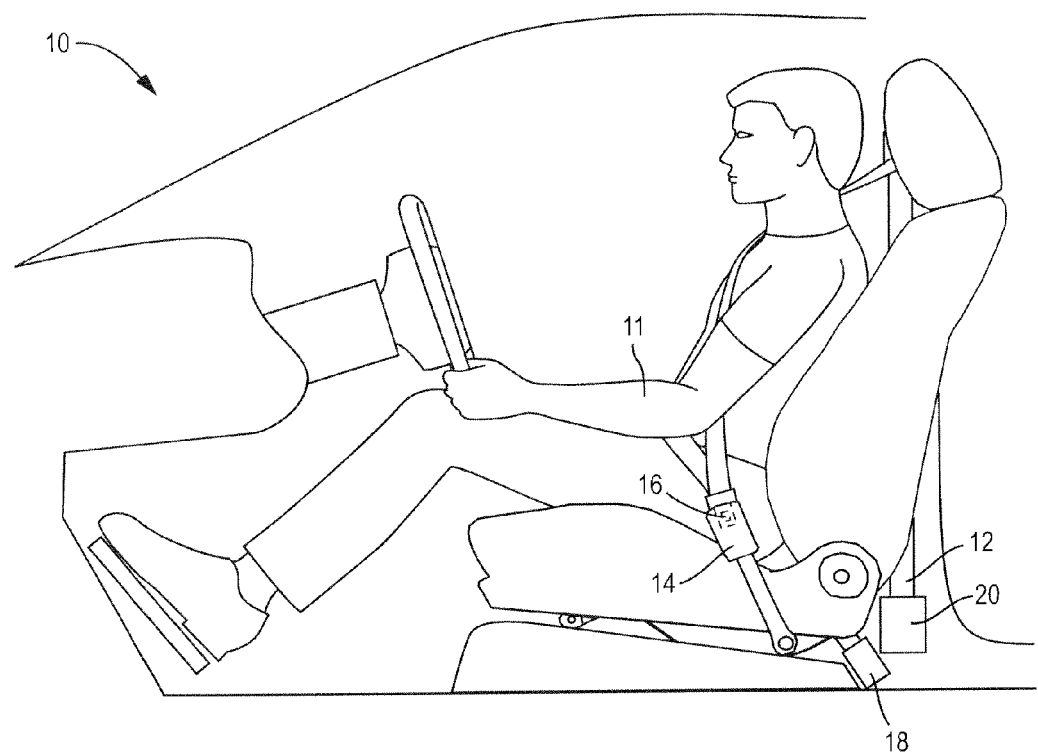
FIG. 1 is a side view of a vehicle interior showing a seat belt system including a retractor, according to an exemplary embodiment.

FIG. 1 illustrates an exemplary embodiment of a seat belt system 10 for use within a vehicle (e.g., a motor vehicle, an electric vehicle, a hybrid vehicle, etc.) to help restrain the movement of an occupant 11 of the vehicle during a sudden acceleration (e.g., a dynamic impact event of the vehicle). As used herein, the term "acceleration" refers to the absolute value of the change in velocity over the change in time of the vehicle, whether negative (e.g., a deceleration) or positive. As shown, the seat belt system 10 includes a seat belt 12 (e.g., a webbing), a buckle 14 (e.g., a buckle mechanism), a tongue member 16 configured to selectively (e.g., detachably, removably, etc.) engage the buckle 14, an anchor member 18, and a retractor 20. The tongue member 16 may be slidably attached to the seat belt 12 to allow relative movement therebetween, such as to allow the secured occupant 11 to adjust the seat belt 12 for comfort. The tongue member 16 may also separate the seat belt 12 into more than one portion, such as a lap portion and a shoulder portion, which may be configured to restrain different portions of the occupant (e.g., the lap, the torso).

The seat belt 12 may include a first end and a second end, where the first end may be provided at the lap portion and may be coupled (e.g., fixedly coupled) to the anchor member 18 to secure the first end of the seat belt 12. The second end of the seat belt 12 may be provided at the shoulder portion and may be operatively coupled to the retractor 20, to allow the seat belt 12 to wind (e.g., retract, etc.) and unwind (e.g., extract, pay out, etc.) from the retractor 20.

It is noted that the seat belt system 10 may be configured differently than shown, and may have any suitable configuration that includes a retractor and a seat belt. Further, the retractor 20 may be configured to be coupled to the vehicle (e.g., a floor member), to a member of a seat (e.g., a frame member), or to any suitable member of the vehicle to fix the position of the retractor 20 in place.

The retractor 20 may include a frame (not shown) configured to couple the retractor 20 to another object (e.g., seat, vehicle floor, etc.) and a spool assembly configured to couple to an end of the seat belt. The spool assembly may be pivotally supported by the frame, such that the spool assembly (or an element thereof) may rotate relative to the frame about an axis of rotation to wind/unwind the seat belt 12 from the retractor 20.

According to an exemplary embodiment, the retractor 20 is configured as a non-motorized retractor. For example, the non-motorized retractor 20 may include a drive member 25 (e.g., a drive pin, locking pin, locking member, etc.) having an engaging feature, a lock base 28 (e.g., base, base member, etc.) having a recess 80 (e.g., a slot, groove, channel, etc.) that is configured to guide the movement (e.g., sliding) of the drive member, a rotatable shaft 24 including a coupling feature, a spool 22 configured to wind and unwind the seat belt 12 about an axis of rotation, where the spool includes a central bore that is configured to receive a portion (e.g., a first portion) of the shaft therein, and a longitudinal member 26 (e.g., pinion, pinion member, etc.) that includes a bore (e.g., a longitudinal bore) configured to receive a portion (e.g., a second portion) of the shaft therein. A load is transmitted between the shaft and the drive member when they are engaged, such as when the engaging feature engages the coupling feature. The drive member may be fixed or may be movable, such as between a first position and a second position. In the first position, the engaging feature is decoupled from the coupling feature of the shaft such that no load is transferred (e.g., transmitted) from the shaft to the drive member, and a second position. In the second position, the engaging feature is coupled to the coupling feature of the shaft to transfer (e.g., transmit) a load between the shaft and the drive member. For example, the engaging feature may selectively engage the coupling feature through another bore (e.g., a transverse bore) in the longitudinal member.

According to another exemplary embodiment, the retractor 20 is configured as a motorized retractor, and includes a motor (not shown) as a driving mechanism, which is configured to impart a torque into the retractor 20 either directly or indirectly (e.g., through a gear mechanism). For example, the motor may be a single variable speed DC motor, which may be controlled by a control unit (not shown) having a circuit device (e.g., a printed circuit board) configured to control the operation (e.g., rotational speed, torque, etc.) of the motor to control operation of the retractor (e.g., the spool assembly).

Figure 3:
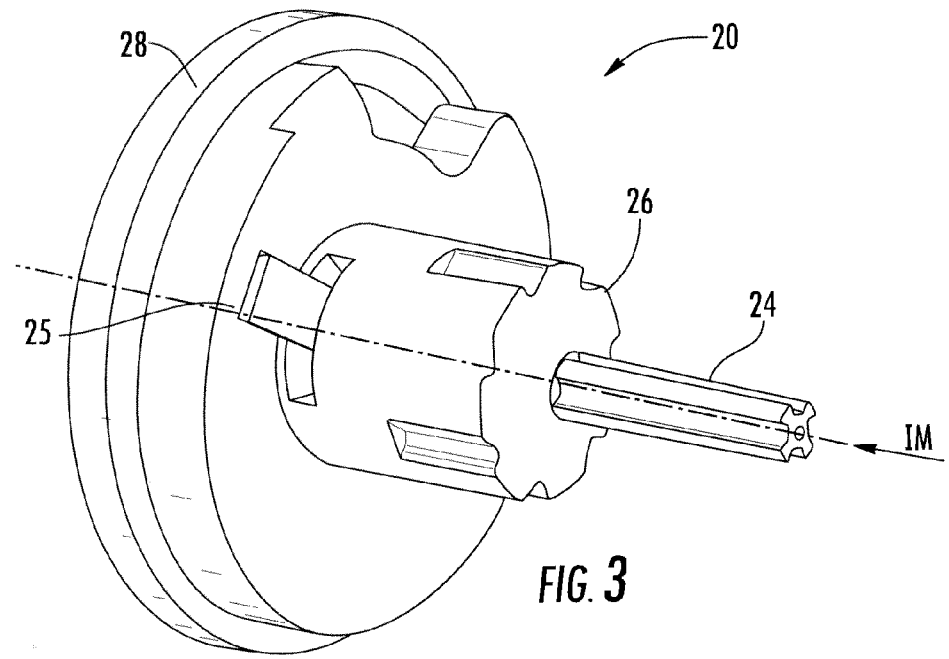
FIG. 3 is a perspective view of the portion of the retractor of FIG. 2, without the spool.

The motor may be configured to control the tension of the seat belt (e.g., belt tension on the secured occupant). For example, the motor can be configured to unwind and wind the seat belt to control the tension of the seat belt to influence the comfort of the secured occupant. In other words, the motor of the retractor can be configured to rotate the shaft (e.g., the torsion bar 24) in a first rotational direction (e.g., direction D1) and a second rotational direction (e.g., direction D2) that is opposite to the first rotational direction. As shown in FIG. 3, the arrow $I_m$ corresponds to a torque that is input into the torsion bar 24, either directly or indirectly, from the motor, according to an exemplary embodiment.

The motor may be configured to turn the spool, such as indirectly through the system, to retract the seat belt in response to sudden braking, sudden movements in the steering wheel, or sideway movements. The motor may also provide other functions, such as assisting in retracting the seat belt back into the retractor housing. As an example, the motorized retractor may be configured to alert the driver of the vehicle to impending or potential dangers by moving the seat belt. One such warning may be in the form of having the motor move the spool of the retractor to wind and unwind the seat belt a number of times (e.g., two times, three, times) over a short period of time. Thus, the motorized retractor may alert the driver to potential danger by pulling on the seat belt securing the driver a number of times in short succession.

The motorized retractor may also include a gear mechanism (not shown) that is configured to control the operation (e.g., speed, torque, etc.) of the rotational power that is input into the spool assembly from the motor. For example, the gear mechanism may include one or more gears (e.g., a gear train) that are configured to reduce the speed of the spool assembly compared with the speed of the motor. It is noted that the elements of the motorized retractor 20 (e.g., frame, motor, gear mechanism, etc.) may be configured the same as, similar to, or different than the corresponding elements disclosed in, for example, U.S. Pat. No. 7,380,740 and/or U.S. Pat. No. 6,427,935, which are hereby incorporated by reference in their entireties.

The retractor 20 may be configured to operate in more than mode of operation. For example, the retractor 20 may operate in a first mode of operation, which allows the spool assembly to rotate freely (e.g., in the winding and unwinding directions). Also, for example, the retractor 20 may be configured to switch to a second mode of operation when subjected to a threshold acceleration, such as a vehicle dynamic event. In the second mode of operation, the retractor 20 is configured to lock the spool assembly to prohibit the seat belt 12 from extracting or unwinding to restrict movement of the occupant, during a vehicle event that reaches a threshold acceleration. The retractor 20 may optionally be configured to operate in a third mode of operation, wherein the motor may variably wind/unwind the webbing with a specific (e.g., a predetermined) tension.

The seat belt system 10 may optionally include one or more than one sensor (not shown) configured to detect a sudden acceleration of the vehicle. The one or more than one sensor may be configured to send a signal to a controller, such as a control unit, (not shown) to activate the retractor 20 as appropriate depending on whether the sensor detects a low or high acceleration event. The sensors may provide information to the control module, which then controls the operation of the retractor (and motor if provided).

FIGS. 2-5 illustrate an exemplary embodiment of a portion (e.g., a spool assembly) for a retractor, such as, the retractor 20 of the seat belt system 10. As shown, the retractor 20 includes a spool 22, a shaft in the form of a torsion bar 24, a longitudinal member in the form of a pinion 26, a lock base 28, and a drive member 25. The pinion 26, spool 22, torsion bar 24, and lock base 28 may be configured to share a substantially common axis of rotation 30 about which the seat belt 12 may be extracted or retracted. In other words, the spool 22 may be configured to rotate about the axis of rotation 30 to wind/unwind the seat belt 12 coupled to the spool 22 and one or more of the other components of the retractor may include features that are concentric to the spool. As mentioned, the spool assembly may be pivotally coupled to a frame and coupled (e.g., directly, indirectly) to a motor (not shown).

The motor may be configured to pretension the retractor 20 and may include a coupling member to drive rotational motion into the shaft (e.g., the torsion bar 24) during pretensioning. For example, the motor may be configured to turn the spool 22 in a seat belt retracting direction D2 in a high force collision to take up any slack in the seat belt system and better position the occupant (e.g., in relation to an airbag system). The motor is also configured to provide tactile feedback to the driver of the vehicle in response to a potential hazard detected by a vehicle sensor. For example, the vehicle may be equipped with a radar device mounted in the front portion of the vehicle. If the radar device detects a potential hazard (which includes combining the distance from the car in front, the relative speed of the car, and other information), then the retractor 20 may be configured to warn the driver by lightly pulling once or multiple times on the seat belt 12, such as by retracting then extracting the seat belt slightly with the motor.

The spool 22 may be made from a metal (e.g., steel) or any other material that is strong enough to transmit the high torque during loading by the occupant when in a fixed position and/or generated by the motor acting as a pretensioner, and may be made through conventional methods (e.g., forging, broaching, machining). As shown, the spool 22 is configured as a generally cylindrical member, which the seat belt 12 is configured to couple to. The cylindrical member may have a first end and a second end. According to an exemplary embodiment, the first end is disposed adjacent to the lock base 28 and the second end is disposed adjacent to the motor. As shown, the spool 22 includes a bore 23 (e.g., a central bore) that extends along the axis of rotation and is configured to receive at least a portion of the torsion bar 24, such as the first portion of the torsion bar 24. The bore 23 may extend from the first end to the second end of the spool 22, or may extend only through a portion of the spool.

Figure 2:
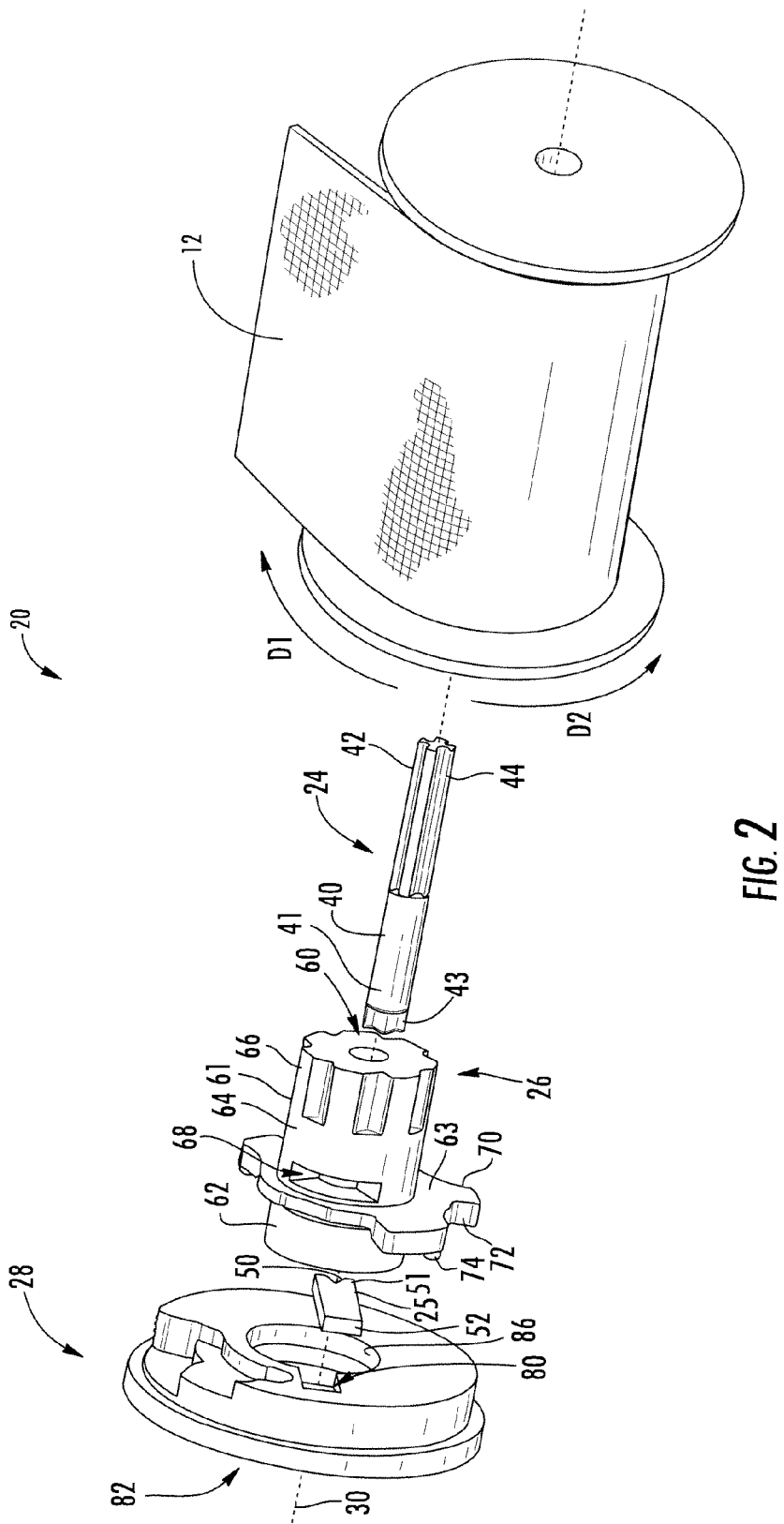
FIG. 2 is an exploded isometric view of a portion of a retractor for a seat belt system, according to an exemplary embodiment.

The torsion bar 24 may be made from a metal (e.g., steel) or any other material that is strong enough to transmit the high torque generated by the motor acting as a pretensioner and may be made through conventional methods (e.g., forging, broaching, machining). As shown in FIG. 2, the torsion bar 24 includes a first end 41, a second end 42, and a bearing surface 40 disposed between the ends. The bearing surface 40 may be configured to support, for example, a portion (e.g., an end) of the pinion 26, such as to allow for efficient relative rotation between the torsion bar 24 and the pinion 26.

The first end 41 of the torsion bar 24 may be configured to extend into the pinion 26, such as to allow a portion of the torsion bar 24 to be able to be selectively engaged by the drive member 25. For example, the first end 41 may pass through an opening (e.g., a bore) in the pinion 26 to allow a portion of the first end 41 to be in position to be selectively engaged by a portion of the drive member 25, as discussed below.

The second end 42 of the torsion bar 24 may be operatively coupled to the motor (not shown) via a coupling feature 44, such as with a tooth mesh, a key-way, or another suitable feature that is capable of transferring torque from the motor to the second end 42 of the torsion bar 24. For example, the coupling feature 44 may include a plurality of alternating channels and protrusions disposed at different radial locations around the periphery of the end (e.g., disposed at different locations circumferentially around the end). As shown, the coupling feature 44 includes four spaced apart protrusions having one of four channels provided between each adjacent pair of channels. The protrusions may have a generally rectangular shape or any suitable shape that is capable of transferring torque. It is noted that the torsion bar 24 may be directly coupled to the motor or indirectly coupled to the motor, such as through a gear.

The coupling feature 44 of the second end 42 may be configured to transfer torque (e.g., from the motor) to drive rotation of the spool and to facilitate the torsion bar 24 absorbing a predetermined torque to provide energy management to the system. For example, the torsion bar 24 may absorb a torque and energy through first elastic deformation, then second by plastic deformation, as the torsion bar yields under the torque generated by the extracting belt force resulting from the force of the occupant being decelerated during a vehicle impact event.

The torsion bar 24 may include a coupling feature 43 that is configured to couple the torsion bar 24 to the drive member 25, such as to selectively transmit a load from the torsion bar 24 to the drive member 25. As shown in FIG. 2, the coupling feature 43 is provided near the first end 41 of the torsion bar 24. However, the coupling feature 43 may be provided at other locations along the torsion bar 24. According to an exemplary embodiment, the coupling feature 43 includes at least one tooth (e.g., projection, extension, etc.) that is configured to complement a mating engaging feature 50 of the drive member 25. For example, each tooth of the coupling feature 43 may have a generally triangular shape or profile that is configured to engage an engaging feature 50 configured as a mating triangular recess in the drive member 25. According to other exemplary embodiments, the tooth of the coupling feature 43 may have a generally rectangular shape that is configured to engage a mating rectangular recess in the drive member 25, or may have any suitable shape that is capable of being engaged by a feature of the drive member 25 to prohibit relative rotation between the drive member 25 and the portion of the torsion bar 24 having the coupling feature 43. According to yet another exemplary embodiment, the engaging feature 50 of the drive member 25 includes a tooth that is configured to engage a recess of the coupling feature 43 of the torsion bar 24. It is noted that the construction of the torsion bar 24 is not limited to that disclosed herein, and the shaft (e.g., torsion bar) may be constructed having any geometry which transmits the required load (e.g., torque) to the drive member.

The pinion 26 may be made from a metal (e.g., steel) or any other material that is strong enough to transmit the high torque generated by the motor acting as a pretensioner and may be made by conventional methods (e.g., forging, broaching, machining). As shown in FIG. 2, the pinion 26 includes a bore 60 that is substantially concentric with the axis of rotation 30 and is configured to receive the torsion bar 24 therein. For example, the bore 60 may be configured to receive a portion (e.g., the first end 41) of the torsion bar 24.

The pinion 26 may include one or more than one shoulder and/or sections (e.g., portions). As shown in FIG. 2, the pinion 26 includes a first shoulder 61 and a second shoulder 62 extending away from an intermediate section 63. As shown, the first and second shoulders 61, 62 extend in opposing directions from opposite sides of the intermediate section 63. For example, the first shoulder 61 may extend toward the spool 22, and the second shoulder 62 may extend toward the lock base 28 and away from the spool 22.

The first shoulder 61 of the pinion 26 may be configured to receive a portion of the torsion bar 24. As shown in FIG. 2, the first shoulder 61 includes a bore 60 that receives the first end 41 of the torsion bar 24. For example, the bore 60 may have an interior bearing surface that supports the bearing surface 40 of the torsion bar 24. The first shoulder 61 may also include an exterior bearing surface 64 and/or cam features 66 on its outer diameter. The bearing surface 64 may be configured to contact the inner surface 86 of the lock base 28 to provide substantial concentricity between the pinion 26, torsion bar 24 and lock base 28, for smooth operation of the spool assembly (e.g., relative rotation between the pinion 26 and the lock base 28). The cam features 66 may be configured to contact coupler pawls (not shown), such as, for example, to selectively engage and disengage the lock base 28 and the spool 22. When engaged, the coupler pawls may prohibit rotation of the spool 22 in the seat belt extraction direction D1, such as during low acceleration events.

The pinion 26 may include an opening 68 that is configured to allow the drive member 25 to access the torsion bar 24 (disposed in the bore 60) to selectively couple them together. As shown, the opening 68 extends through the first shoulder 61 to the central bore 60 at an arc length (e.g., radially from the axis of rotation 30). In other words, the opening 68 may be a radial slot that extends along an arc length having an angular distance (which may be greater than the angular distance A1 discussed below). The opening 68 is configured to be aligned with the drive member 25 to allow the coupling feature 43 of the torsion bar 24 to align with the opening 68 when the torsion bar 24 is fully seated in the pinion 26 to allow the engaging feature 50 to engage the coupling feature 43.

Figure 4:
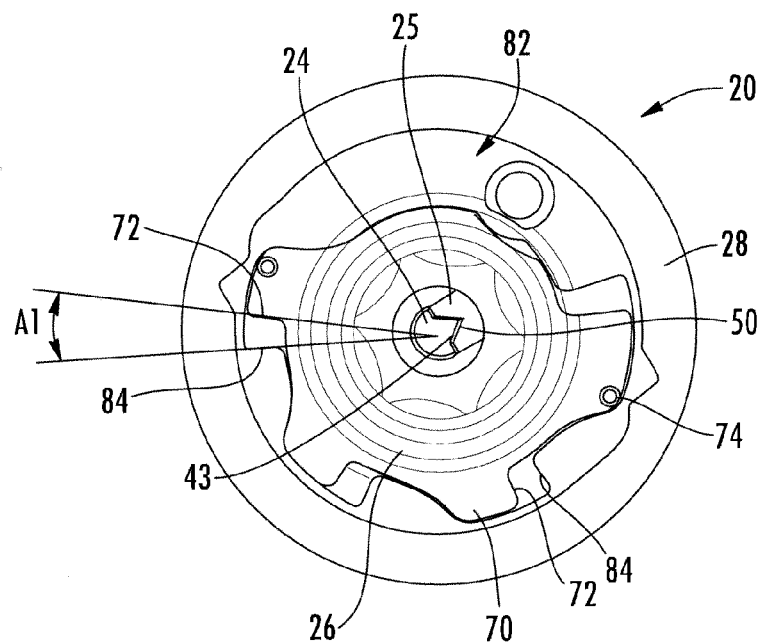
FIG. 4 is an end view of the portion of the retractor of FIG. 2.
Figure 5:
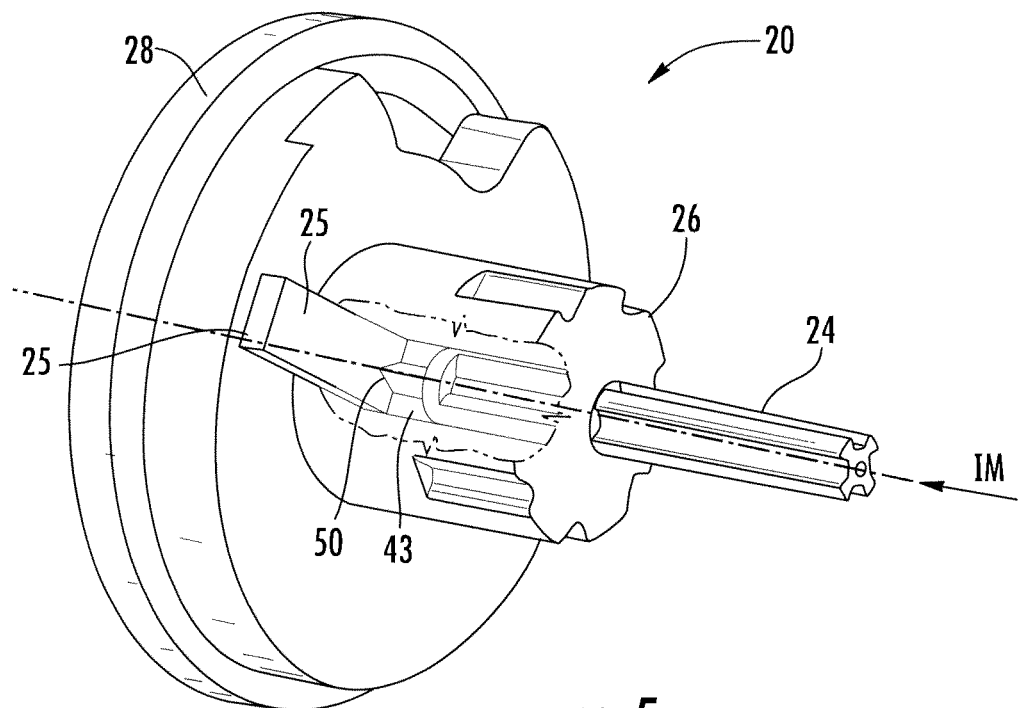
FIG. 5 is a partial cut-away perspective view of the portion of the retractor of FIG. 2, showing the load path through the portion of the retractor.

The intermediate section 63 may be configured as a shoulder that extends beyond the first and second shoulders 61, 62. The intermediate section 63 may be configured to be disposed in a cavity of the lock base 28, and may include one or more than one arms 70 (e.g., extensions, protrusions, teeth, etc.) which may extend outward in a radial direction from the first shoulder 61 (e.g., the bearing surface 64). As shown in FIG. 4, the pinion 26 includes four arms 70 that extend at different radial locations. Each arm 70 may include a contact surface 72, which may be configured to contact a mating contact surface 84 on the lock base 28, upon relative rotation between the lock base 28 and the pinion 26 about the axis of rotation by a predetermined angular distance A1. For example, the pinion 26 and the lock base 28 may rotate relative to one another during pretensioning of the seat belt system to transfer a load (e.g., a torque) through the contact surfaces 72 and 84, after the surfaces are brought into contact.

The pinion 26 may optionally include a feature (e.g., a pin) that is configured to shear at a predetermined torque. For example, the intermediate section 63 (e.g., an arm 70) may include one or more than one shear pin 74 configured to shear at a low torque, thereby allowing relative rotation between the pinion 26 and a stationary frame member (not shown) during a high acceleration event in which the motor is operated to pretension the seat belt system. As shown in FIG. 4, the pinion 26 includes two shear pins 74, with each pin 74 provided on one of two opposing arms.

The pinion 26 may optionally include the second shoulder 62, such as to provide an additional bearing surface. For example, the second shoulder 62 may have an outer bearing surface that engages a mating surface to help maintain the concentricity of the pinion 26 and/or the other components of the retractor 20 relative to another component of the retractor, such as the frame. The construction of the pinion 26 is not limited to that disclosed above, and may be constructed having any geometry which transmits the required torque to another member.

As shown in FIG. 2, the drive member 25 is an elongated planar member with a first end 51 and a second end 52. The first end 51 is inserted into the radial opening 68 of the pinion 26 and includes an engaging feature 50 that is configured to engage the coupling feature 43 of the torsion bar 24 to couple the drive member 25 and the torsion bar 24. The second end 52 of the drive member 25 engages the lock base 28 to couple the drive member 25 and the lock base 28 to prohibit relative rotation between the lock base 28 and the drive member 25. For example, the second end 52 of the drive member 25 may engage a recess 80 of the lock base 28. The drive member 25 may be made from steel or other material with sufficient strength properties to transmit the high loads (e.g., torque) generated by the motor acting as a pretensioner and may be made through conventional methods (e.g., forging, broaching, machining).

According to an exemplary embodiment, the drive member 25 is fixed relative to the lock base 28. In other words, the drive member 25 may be non-movable (e.g., stationary) relative to the lock base 28. For this embodiment, the size of the recess 80 may be configured to retain the drive member 25 in place, while prohibiting relative movement (e.g., sliding) between the drive member 25 and the lock base 28.

According to an exemplary embodiment, the drive member 25 is moveable relative to the lock base 28. For example, the drive member 25 may be configured to move (e.g., slide) in the recess 80 between a first position, in which the engaging feature 50 does not engage the coupling feature 43 of the first end 41 of the torsion bar 24, and a second position, in which the engaging feature 50 does engage the coupling feature 43 to transmit a load (e.g., torque, force, etc.) between the torsion bar 24 and the lock base 28 through the drive member 25.

According to yet another exemplary embodiment, the drive member 25 is fixed, and the torsion bar 24 is movable along the axis of rotation 30 between a first position, in which the engaging feature 50 does not engage the coupling feature 43 of the first end 41 of the torsion bar 24, and a second position, in which the engaging feature 50 does engage the coupling feature 43 to transmit a load (e.g., torque, force, etc.) between the torsion bar 24 and the lock base 28 through the drive member 25. In other words, the shaft (e.g., torsion bar 24) of the retractor may be movable in a direction along the axis of rotation to couple and decouple the connection between the shaft and the drive member (e.g., the drive member 25).

The lock base 28 may be made from steel or any other suitable material (e.g., zinc) strong enough to transmit the torque transferred through the lock base 28 during low acceleration events, where the motor does not pretension the seat belt system, and may be made through conventional methods (e.g., cast, cold forged, machined). A face (e.g., an inner surface) of the lock base 28 may include at least one recess (e.g., cavity) that is configured to receive a coupler pawl (not shown) that is configured to swing (e.g., rotate), when the locking of the retractor is activated, to engage at least one tooth (e.g., a ratchet tooth) on the frame of the retractor to thereby prohibit rotation of the locking base in the seat belt unwinding direction.

The lock base 28 may include a recess configured to receive the drive member 25. As shown in FIG. 2, the inner surface of the lock base 28 includes a recess 80 (e.g., a channel, a groove, etc.) configured to receive the second end 52 of the drive member 25. The recess 80 receives the drive member 25 to prohibit relative rotation between the lock base 28 and the drive member 25 to allow the load transmitted from the torsion bar 24 to the drive member 25 to pass into the lock base 28. The shape of the recess 80 may be tailored to the shape of the drive member 25. As shown, the recess 80 has a generally rectangular cross-section to thereby receive a drive member 25 having a complementary cross-section.

The lock base 28 may also include a cavity that is configured to receive a portion of the pinion 26. As shown in FIG. 4, the lock base 28 includes a cavity 82 that is provided in an outer surface, where the cavity 82 receives the second shoulder 62 and/or the intermediate section 63 of the pinion 26. The lock base 28 may include one or more than one contact surfaces 84, which may be within or defined by the cavity 82, and which are configured to contact the contact surfaces 72 of the pinion 26. As shown, the lock base 28 includes four contact surfaces 84, each of which is configured to be contacted by a contact surface 72 of the pinion 26 upon a relative rotation between the lock base 28 and the pinion 26 about the axis of rotation 30 by an angular distance A1.

The lock base 28 may also include one or more than bearing surface configured to support rotation between the lock base and another component of the retractor. As shown in FIG. 2, the lock base 28 has an inner bearing surface 86 that rotatably supports the bearing surface 64 of the pinion 26 to allow for efficient relative rotation between the lock base 28 and the pinion 26.

Referring especially to FIG. 3, in one embodiment, a load (e.g., a torque) may be input into the torsion bar 24 by the motor to rotate the spool assembly for operations not related to pretensioning the seat belt system. For example, the load may be configured to tug (e.g., retract then extract) on the seat belt one or more times to warn the driver of a potential hazard. The load is transferred along the torsion bar 24 and into the drive member 25 through the interconnection of the coupling features 43 and 50, bypassing the pinion 26 because the bearing surfaces 64 and 86 allow rotation of the torsion bar 24 relative to the pinion 26. The load is further transferred to the lock base 28 through the interconnection of the drive member 25 and the recess 80. The load therefore acts to rotate the lock base 28, which may in turn be configured to rotate the spool 22 in the direction D2 to retract the seat belt 12.

Referring to FIG. 4, a space (e.g., a gap, clearance, etc.) is provided between the contact surfaces 72 and 84 to allow the lock base 28 to be rotated by an angle (e.g., preferably between 10 degrees and 20 degrees, and more preferably about 15 degrees) before engaging the pinion 26. Likewise, the radial opening 68 of the pinion 26 may be sized (e.g., its length, arc length, etc.) such that there is sufficient clearance to allow rotation of the drive member 25 without contacting the pinion 26 and applying a torque to the pinion 26. The shear pins 74 are therefore not fatigued by repeated loading by the motorized seat belt cycles.

The retractor 20 may optionally include a biasing member, such as a spiral or clock spring, which is configured to bias the spool of the retractor. For example, the biasing member of the retractor 20 may bias the seat belt 12 in the seat belt winding direction (e.g., retract the webbing) to remove slack from between the secured occupant and the seat belt 12. When not in use (i.e., securing an occupant), the seat belt 12 may be fully wound on the spool by the biasing force of the biasing member. When in use, the seat belt 12 may be unwound (e.g., extracted, withdrawn, etc.) against the biasing force of the biasing member to allow the seat belt 12 to wrap around the occupant to secure the occupant in the vehicle. Further, the seat belt 12 may be wound/unwound, during normal use (i.e., use not reaching the threshold acceleration), to allow the seat belt 12 to be adjusted relative to the secured occupant to improve comfort.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the retractor as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A retractor for a seat belt system including a seat belt, the retractor comprising:
   a rotatable shaft including a coupling feature;
   a lock base having a recess;
   a spool configured to rotate about an axis of rotation to wind and unwind the seat belt, and wherein the spool includes a central bore that extends along the axis of rotation and is configured to receive a first portion of the shaft therein;
   a longitudinal member including a longitudinal bore and a transverse bore that intersects with the longitudinal bore, the longitudinal bore being configured to receive a second portion of the shaft therein; and
   a drive member including a first portion passing through the transverse bore and a second portion disposed in the recess, the first portion including an engaging feature;
   wherein a load is transmitted between the shaft and the drive member when the engaging feature is coupled to the coupling feature.

2. The retractor of claim 1, wherein the recess is provided in an inner surface of the lock base, and wherein the lock base includes a cavity that is provided in an outer surface.

3. The retractor of claim 2, wherein the longitudinal member includes a shoulder provided adjacent to a bearing surface, wherein the shoulder is disposed in the cavity of the lock base and the bearing surface pivotally supports a mating bearing surface of the lock base.

4. The retractor of claim 3, wherein the shoulder of the longitudinal member includes a plurality of arms, and wherein each arm includes at least one contact surface that is configured to contact a mating contact surface of the lock base upon a relative rotation between the lock base and the drive member about the axis of rotation by a first angular distance.

5. The retractor of claim 4, wherein the transverse bore of the longitudinal member is configured as a radial slot that extends along an arc length having a second angular distance that is equal to or greater than the first angular distance.

6. The retractor of claim 5, wherein the longitudinal member includes a protrusion extending from the shoulder such that the protrusion is configured to contact a fixed portion of the retractor upon a relative rotation between the longitudinal member and the fixed portion, and wherein the protrusion is configured to shear at a predetermined torque.

7. The retractor of claim 1, wherein the drive member is movable between a first position, in which the engaging feature is coupled to the coupling feature, and a second position, in which the drive member is decouple from the shaft.

8. A motorized retractor for a seat belt assembly including a seat belt, the retractor comprising:
- a spool configured to rotate about an axis of rotation to wind and unwind the seat belt;
- a rotatable shaft including a coupling feature;
- a lock base including a groove; and
- a drive member disposed in the groove and including an engaging feature;
- wherein a load is transferred between the shaft and the lock base through the drive member when the engaging feature engages the coupling feature; and
- further comprising a pinion disposed between the spool and the lock base, wherein the pinion includes a longitudinal bore and a transverse bore, wherein the longitudinal bore is configured to receive a portion of the shaft therethrough, and wherein the transverse bore is configured to receive a portion of the drive member therein.

9. The retractor of claim 8, wherein the transverse bore in the pinion intersects with the longitudinal bore.

10. The retractor of claim 9, wherein the drive member is movable between a first position and a second position in a direction that is transverse to the axis of rotation, and the groove is configured to guide the movement of the drive member.

11. The retractor of claim 10, wherein when the drive member is in the first position, the engaging feature does not engage the coupling feature, and wherein when the drive member is in the second position, the engaging feature engages the coupling feature to transfer the load between the shaft and the lock base through the drive member.

12. The retractor of claim 9, wherein the transverse bore of the pinion is an arcuate slot that extends radially around a portion of an exterior surface of the pinion.

13. The retractor of claim 12, wherein the exterior surface of the pinion is a bearing surface configured to pivotally support an inner bearing surface of the lock base to align the pinion and lock base in a substantially concentric manner.

14. The retractor of claim 8, wherein the engaging feature of the drive member includes a tooth that is configured to engage a complementary tooth of the coupling member of the shaft when the drive member is in the second position to transfer the load from the shaft to the drive member.

15. The retractor of claim 8, wherein the shaft is configured to be rotated in a first rotational direction and a second rotational direction that is opposite to the first rotational direction.

* * * * *